Aug. 27, 1929.  P. S. SHIELD  1,726,319
PNEUMATIC CONTROL FOR TRUCK TANK VALVES
Filed Sept. 1, 1926   2 Sheets-Sheet 1
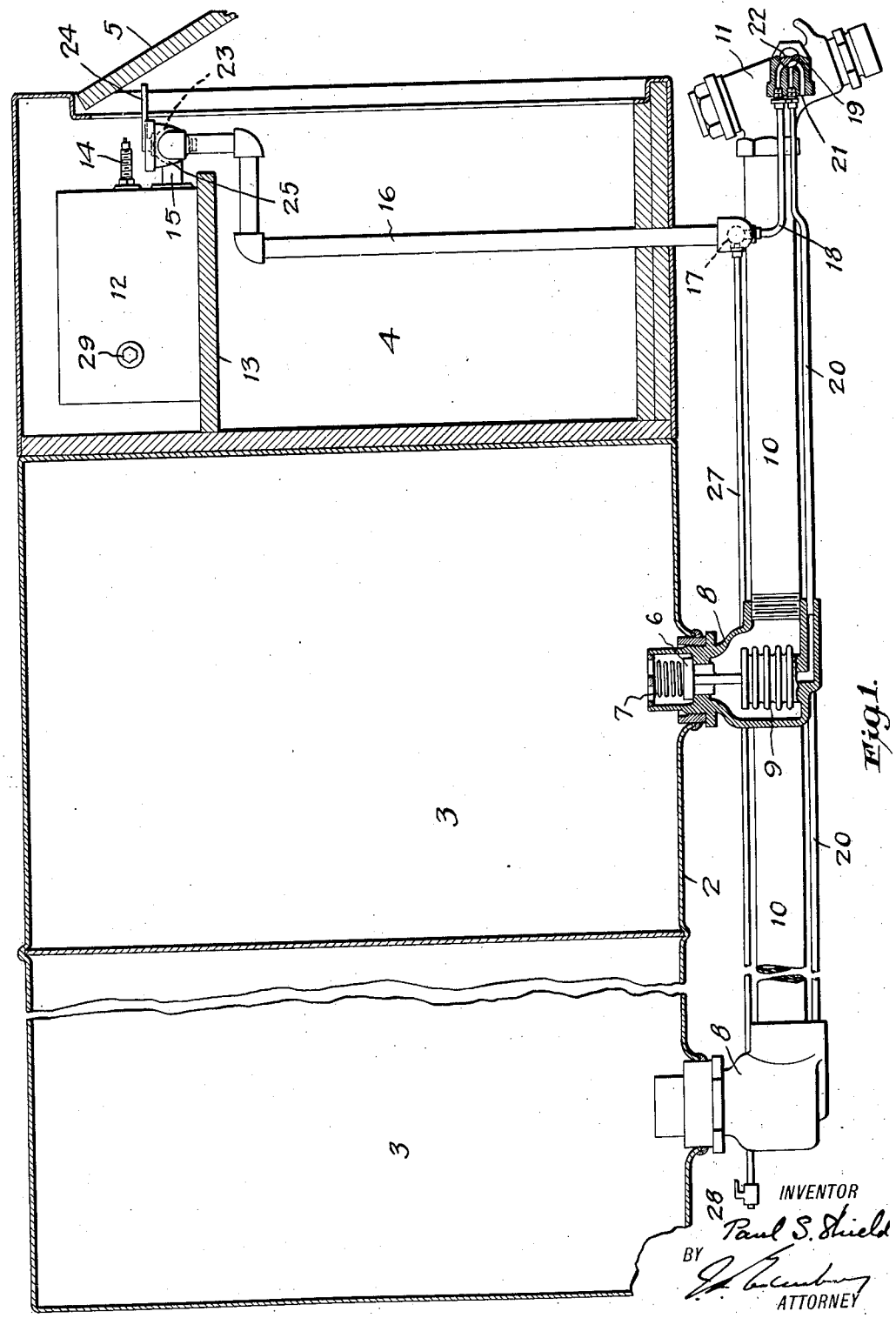

Aug. 27, 1929.　　　P. S. SHIELD　　　1,726,319
PNEUMATIC CONTROL FOR TRUCK TANK VALVES
Filed Sept. 1, 1926　　2 Sheets-Sheet 2
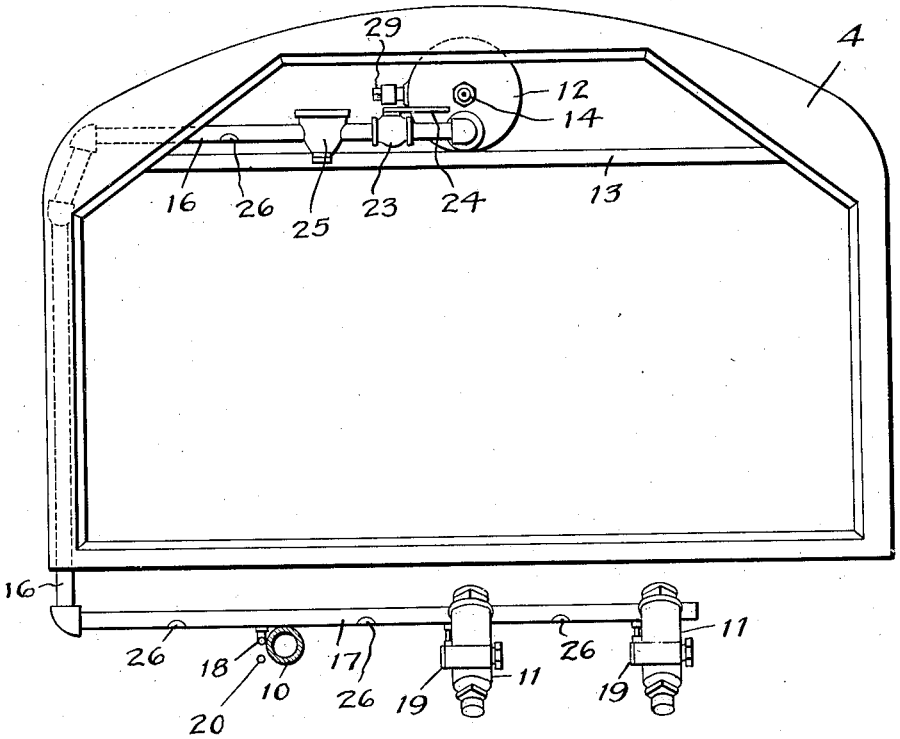
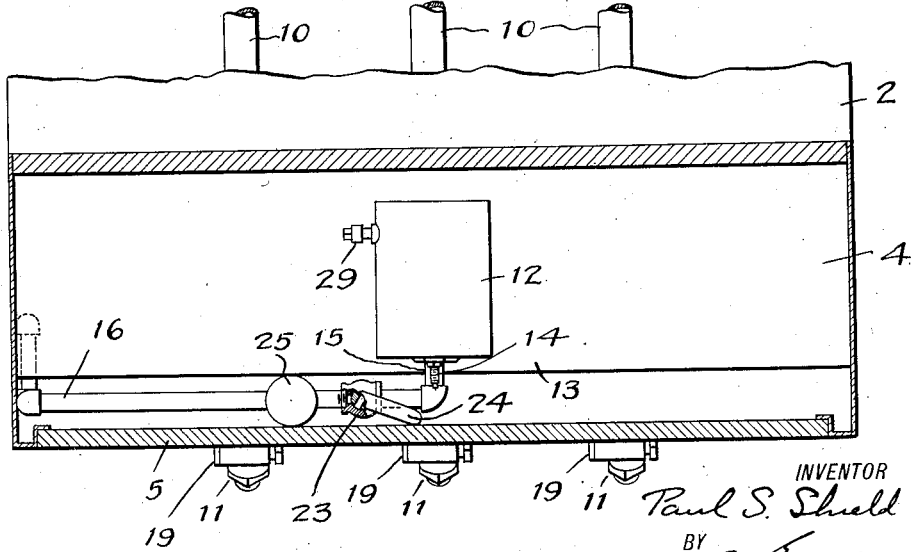
INVENTOR
Paul S. Shield
BY
ATTORNEY Patented Aug. 27, 1929.

1,726,319

UNITED STATES PATENT OFFICE.

PAUL S. SHIELD, OF CINCINNATI, OHIO, ASSIGNOR TO AUGUSTINE DAVIS, JR., OF CINCINNATI, OHIO.

PNEUMATIC CONTROL FOR TRUCK-TANK VALVES.

Application filed September 1, 1926. Serial No. 133,029.

The object of the invention is to provide a very simple, convenient, safe, reliable and quick-acting pneumatic system for controlling independently the outlet valves of a multiple compartment truck tank. To this end the invention comprises the combinations of parts which will be described and more particularly pointed out in the claims.

In the accompanying drawings forming part hereof:

Fig. 1 is a longitudinal section through a plural compartment truck tank and the bucket-box at the rear end thereof, with an intermediate portion of the tank broken out, one of the outlet valves being shown in section and another in elevation, one of the control valves at a faucet being shown in section, the door of the bucket-box being partly open and broken away, and the lever of the master valve being shown in the position which it assumes when this valve is open;

Fig. 2 is a rear elevation, omitting the door of the bucket-box, one of the delivery pipes and the corresponding control lines being in cross-section; and Fig. 3 is a sectional plan showing parts in the bucket-box, with the door closed.

The truck tank 2 may be understood as having three compartments, designated 3. At the rear end of the tank is the usual bucket-box 4, in which buckets and other necessary items of equipment are carried, 5 being the door of this box.

Each tank compartment has a safety or "emergency" valve 6, which, in the case of a gravity tank, is a bottom outlet valve closing downwardly on its seat under the action of a spring 7 and the pressure of the liquid. Each of the outlet valve bodies 8 contains a bellows device 9, or its equivalent, to be actuated by fluid pressure for raising and opening the valve.

Delivery pipes 10 extend rearward beneath the tank from the outlet valve bodies 8 to the rear end of the vehicle, where they carry faucets 11.

A small tight tank or vessel 12 of suitable strength is mounted in the box 4, on a shelf 13, and is equipped with a tire-valve inlet 14 by which it may be charged occasionally with air under comparatively high pressure, say eighty or ninety pounds. The amount of air that may be stored in this manner will serve for several hundred operations of one of the devices 9.

The outlet of the vessel 12 is marked 15, and from this outlet piping 16 extends downward through the bucket-box and then across behind the faucets 11 to form a manifold 17. From this manifold small branches 18 are taken off and extend to control valves 19 carried by the faucets, while from these valves other lines 20 extend to the fluid-operated devices of the corresponding tank outlet valves 6. The casing of each control valve has a vent 21 to the atmosphere, and the valve member 22, in one position, will connect the line 20 with the pressure branch 18, closing the vent, while in the other position it connects the said line with the vent and closes off communication with the pressure. The valves 19 are so connected and related to the faucets that when a faucet is opened, the corresponding device 9 is automatically connected with the pressure side of the system, causing the outlet valve 6 to open, while when the faucet is closed the device 9 is vented, permitting the tank valve to close.

A master-valve 23 is interposed in the piping 16 between the outlet of the storage vessel 12 and the manifold 17. This valve is ordinarily closed, preventing any pressure escaping from the tank, but may be opened by a lever 24 when the door 5 is opened. The relation of the lever to the door is such that this valve must be closed when or before the door is closed, and as the door of this box is always closed before the truck leaves the place where it is filled or a place where it makes delivery, there is a reliable insurance that the valve will be closed except when a delivery is to be made. This relation between the door and valve is an interlock, meaning by that term any relation, interference or connection serving the purpose indicated.

An automatic pressure reducing and regulating valve 25 is also connected in the piping 16, to reduce the high storage pressure to a moderate and substantially uniform operating pressure to be applied to the devices 9. The shut-off valve 24 is placed between this reducing valve and the vessel 12.

It will thus be seen that the tank valves can be operated over a considerable period of time without recharging the pressure reservoir, and that the system is safeguarded against mischievous, fradulent or accidental operation by the same means that prevents loss of pressure by leakage. The reducing valve not only avoids wasteful use of the air, but also protects the devices 9 against possible injury, and avoids the loss by air leaks at the valves 19 or elsewhere which might occur if high pressure were on these parts.

For protection against fire, fusible plugs 26 are inserted in the piping 16 and 17. A pipe 27 also extends from this piping forward to the front end of the vehicle, where it is provided with a suitably located manual relief valve 28, opening of which will vent the system in case of an emergency.

With this apparatus the driver will be provided with an ordinary tire gauge to test the pressure in the vessel 12, by applying the gauge to the valve 14, and he may also be provided with an ordinary tire pump to use in the event of finding himself without an operating pressure at a place where a supply of compressed air would not be available. The vessel may be, however, furnished with an extra plugged connection 29, to receive a pipe leading from any source of air pressure on the vehicle, such as a tire pump driven by the engine of the vehicle.

The vessel 12 need not necessarily be located in the bucket-box as long as the master valve 23, or its connection, is in an interlocking or interfering relation to the door.

I claim:

1. In a vehicle tank, the combination with a plurality of tank chambers, normally closed valves commanding the outlets therefrom, and pneumatic controlling devices for operating said valves, pneumatic lines connected with the several pneumatic devices, a control valve for each of said lines adapted to connect each of said devices alternately with pressure and with a vent, said control valves being operable independently of each other, a pressure vessel connected with all of said control valves, and a valve interposed between said vessel and said control valves adapted in one position to place said control valves in communication with said vessel and in another position to shut off the communication between said vessel and all the control valves and in the latter position to retain the pressure in said vessel.

2. In a vehicle tank, the combination with a plurality of tank chambers, normally closed valves commanding the outlets therefrom, and pneumatic controlling devices for operating said valves, pneumatic lines connected with the several pneumatic devices, a control valve for each of said lines adapted to connect each of said devices alternately with pressure and with a vent, said control valves being operable independently of each other, a pressure vessel connected with all of said control valves, a valve interposed between said vessel and said control valves adapted in one position to place said control valves in communication with said vessel and in another position to shut off the communication between said vessel and all the control valves and in the latter position to retain the pressure in said vessel, and a safety interlock between said last-mentioned valve and a movable part.

3. In a vehicle tank, the combination with a plurality of tank chambers, normally closed valves commanding the outlets therefrom, and pneumatic controlling devices for operating said valves, pneumatic lines connected with the several pneumatic devices, a control valve for each of said lines adapted to connect each of said devices alternately with pressure and with a vent, said control valves being operable independently of each other, a pressure vessel connected with all of said control valves, a valve interposed between said vessel and said control valves adapted in one position to place said control valves in communication with said vessel and in another position to shut off the communication between said vessel and all the control valves and in the latter position to retain the pressure in said vessel, and pressure reducing means interposed between said last-mentioned valve and said control valves.

PAUL S. SHIELD.